United States Patent [19]

Visalli

[11] 4,151,979

[45] May 1, 1979

[54] DIAPHRAGM VALVE HAVING A BELLEVILLE-SPRING ASSEMBLY

[75] Inventor: Robert G. Visalli, Murrysville, Pa.

[73] Assignee: Kerotest Manufacturing Corp., Pittsburgh, Pa.

[21] Appl. No.: 765,298

[22] Filed: Feb. 3, 1977

[51] Int. Cl.² ............................................. F16K 31/50
[52] U.S. Cl. .................................. 251/322; 251/323; 251/337
[58] Field of Search ................... 251/323, 322, 335 A, 251/337

[56] References Cited

U.S. PATENT DOCUMENTS

| | | | |
|---|---|---|---|
| 3,168,108 | 2/1965 | Patrick | 251/323 X |
| 3,982,729 | 9/1976 | Tricini | 251/214 |

*Primary Examiner*—Arnold Rosenthal
*Attorney, Agent, or Firm*—Stanley J. Price, Jr.; John M. Adams

[57] ABSTRACT

A valve member is axially supported for reciprocal movement within the lower portion of the chamber of a valve housing. The chamber lower portion is sealed from the chamber upper portion by a flexible diaphragm assembly. The valve member includes a cap maintained in abutting relation with the lower surface of the diaphragm assembly. A valve stem is coaxially aligned with the valve member above the diaphragm assembly and includes a head portion that abuts the diaphragm assembly opposite the cap. Downward movement of the valve stem is transmitted through the diaphragm assembly to downwardly move the valve member into sealing relation with the valve seat. The valve is opened by advancing the valve stem upwardly within the chamber. A Belleville spring assembly surrounding the valve member urges the valve member to move away from the valve seat to open the valve. The Belleville spring assembly includes a plurality of parallel arranged spring washers stacked in series relation between a valve guide surrounding the valve member and the cap. The series stack of parallel arranged Belleville washers exerts a preselected thrust upon the valve member to move the valve member through a relatively short stroke and open the valve while maintaining a stabilizing force on the valve member throughout its stroke.

1 Claim, 2 Drawing Figures

DIAPHRAGM VALVE HAVING A BELLEVILLE-SPRING ASSEMBLY

BACKGROUND OF THE INVENTION

1. Field of the Invention

This invention relates to a valve and more particularly to a diaphragm type valve having a valve member arranged to move between an open and a closed position with a Belleville spring assembly surrounding the valve member and arranged to apply a thrust thereon to move the valve member through a short stroke to an open position.

2. Description of the Prior Art

It is known with conventional Y-type diaphragm valves as disclosed in U.S. Pat. Nos. 3,979,105 and 3,982,729 to support a valve member for axial movement within a valve chamber between an open position removed from a valve seat connecting the inlet and outlet of the chamber and a closed position engaging the valve seat to interrupt flow through the chamber. The valve member is supported for axial movement within the chamber and is advanced into the closed position by downward movement of a valve stem which abuts the top of a flexible diaphragm assembly positioned within the chamber between the valve stem and the valve member. The downward force of the valve stem is transmitted through the diaphragm assembly to the valve member. A coil spring is retained within the chamber around the valve member and is arranged to abut at one end portion a cap of the valve member and at the opposite end portion the shoulder of a spring guide that is supported within the chamber surrounding the valve member. The spring urges the valve member upwardly into contact with the diaphragm to maintain the valve in a normally open position. When the valve member is moved downwardly by the force generated by the valve stem, the coil spring is compressed between the cap and spring guide.

In order to insure engagement of the valve member with the valve seat to seal the valve, it is essential that the valve member be maintained in an axial position within the valve chamber. Deviation from an axial position of the valve member causes deformation of the valve member and/or results in improper seating of the valve member upon closure and renders the valve inoperable to control the flow of fluid between the inlet and outlet. Therefore, unless the valve member is stabilized for axial movement within the chamber the effects of extreme fluid flow and/or vibration may be sufficient to displace the valve member from its axial alignment and prevent complete closure of the valve. Also if the valve member is not securely stabilized within the chamber, it will spin, causing displacement from axial alignment.

It has been the practice to increase the strength of the valve member to resist deformation within the chamber by increasing the mass of the valve member. However, this reduces the area available for the coil spring. Sufficient area must be available to insure that the coil spring exerts a sufficient force to move the valve member through a linear stroke that displaces it from engagement with the valve seat. A problem is presented in providing a suitable spring of a size sufficient to generate a higher stabilizing thrust to move the larger valve member away from the valve seat while maintaining a stabilizing force on the valve member throughout its stroke.

There is need in a diaphragm valve for a spring that is operable to exert an increased higher thrust upon a larger valve member to move the valve member through a relatively short stroke to an open position while stabilizing the axial position of the valve member in the chamber.

SUMMARY OF THE INVENTION

In accordance with the present invention there is provided a valve that includes a valve housing having a chamber with inlet and outlet openings in the valve housing communicating with the chamber. A valve seat is provided in the chamber between the inlet and outlet openings. A valve member is positioned for axial movement in the chamber and in overlying relation with the valve seat to control the flow of fluid between the inlet and outlet openings. The valve member is supported in the chamber to move between a first position engaging the valve seat to close the valve and a second position removed from the valve seat to open the valve. The valve member and the valve housing form an annulus therebetween. A valve guide surrounds the valve member in the annulus. A Belleville spring assembly surrounds the valve member and is positioned within the annulus in abutting relation with the valve member and the valve guide to normally urge the valve member toward the second position.

The Belleville spring assembly includes a plurality of individual spring washers having the configuration of a fustrum of a cone and arranged in series relation in the annulus between the valve member and the valve housing. The series stack of spring washers abut at one end an annular shoulder of a spindle cap of the valve member. The opposite end of the series stack of spring washers abuts the upper cylindrical surface of the valve guide. The valve guide has an axial bore through which a spindle portion of the valve member extends. The spindle portion includes an axial threaded bore. The spindle cap is threadedly engaged in the axial bore of the spindle portion. With this arrangement the valve guide, spindle portion and spindle cap are coaxially positioned within the valve chamber. The valve guide includes a lip that is supported by a shoulder portion of the valve chamber to retain the axial position of the valve guide within the chamber.

In a preferred embodiment a preselected number of spring washers are arranged in series to apply to the spindle cap a preselected force which urges the valve member to an open position. In the open position a diaphragm assembly overlying the spindle cap and providing a seal between the upper and lower portions of the valve chamber is deflected upwardly. However, the arrangement of spring washers is selected to optimize the force and deflection characteristics of the spring washers, thereby providing the maximum stabilizing force on the valve member for a given chamber size.

In order to accommodate the stroke or length of travel of the valve member between the closed and open positions, a preselected number of spring washers are arranged in parallel relation to form a spring unit in which a preselected number of the spring units are stacked in series. Once the load required to urge the valve member to the open position is known, as well as the magnitude of the force required to stabilize the valve member, a preselected number of spring washers is arranged in parallel to comprise a single spring unit in which a plurality of spring units is arranged in a series stack around the spindle portion between the spindle cap and the valve guide. Thus, the Belleville spring assembly provides a high thrust for moving the valve member through a relatively short stroke between the open and closed position. This serves to stabilize the valve member in the chamber and maintain axial movement of the valve member between the open and closed position.

Accordingly the principal object of the present invention is to provide a valve having a valve member movably supported in a valve chamber between a closed position and an open position where the valve is normally maintained by a Belleville spring assembly for generating a preselected thrust upon the valve member to move the valve member through a preselected stroke.

Another object of the present invention is to provide a Y-type diaphragm valve having a Belleville spring assembly operable to normally maintain a valve member of increased mass displaced from a valve seat in a compact valve chamber.

A further object of the present invention is to provide in a Y-type diaphragm valve, a Belleville spring assembly that includes a plurality of units of parallel arranged spring washers stacked in series relation to exert a preselected thrust upon the valve member to move the valve member through a relatively short stroke between an open and a closed position and stabilize the valve member to maintain axial movement relative to the valve seat.

An additional object of the present invention is to provide a valve having a valve member subjected to a preselected thrust for a preselected axial displacement in the valve by a Belleville spring assembly in order to accommodate variations in the operation of the valve.

These and other objects of the present invention will be more completely described and disclosed in the following specification, the accompanying drawings and the appended claims.

DESCRIPTION OF THE PREFERRED EMBODIMENTS

Figure 1:
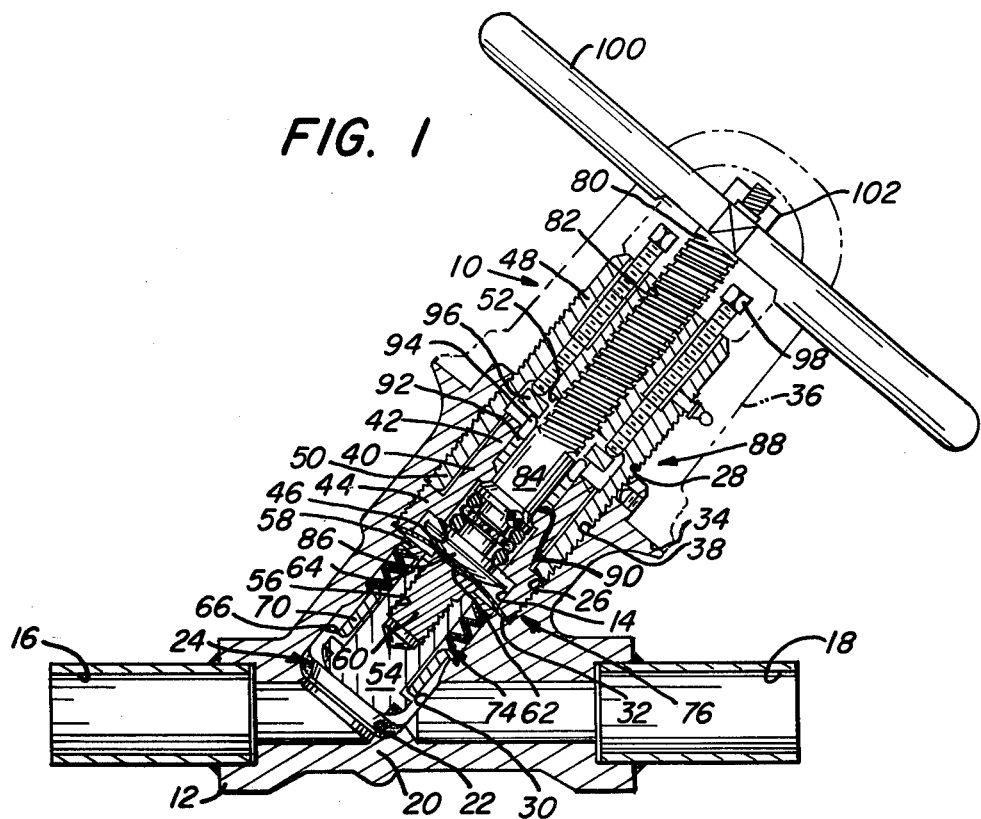
FIG. 1 is a sectional view in side elevation of a diaphragm valve having a valve member normally maintained in an open position by a Belleville spring assembly.

Referring to the drawings and particularly to FIG. 1 there is illustrated a Y-type diaphragm valve generally designated by the numeral 10 having a valve housing 12 with an elongated chamber 14 therein. Inlet and outlet openings 16 and 18 communicate with the chamber 14 for the flow of fluid therethrough. The chamber 14 has a base position 20 with an annular valve seat 22. A valve member 24 is positioned in overlying relation with the valve seat 22 and is arranged to control the flow of fluid between the openings 16 and 18. The valve member 24 is illustrated in a first or open position in FIG. 1. The chamber 14 has an upper portion 26 having an opening 28 and a lower portion 30 that includes the inlet and outlet openings 16 and 18. An annular shoulder portion 32 of the valve housing 12 extends around the lower portion 30 of the valve chamber 14.

A flange portion 34 projects radially outwardly from the shoulder portion 32 and is arranged to receive an optional cap member 36 indicated in phantom on FIG. 1. The valve housing 12 has an upper internally threaded portion 38 in which a bonnet 40 is axially aligned. The bonnet 40 includes upper and lower annular ring portions 42 and 44 with a bonnet passageway 46 therethrough. A yoke member 48 having a lower annular ring portion 50 is positioned in the recess between the valve housing threaded portion 38 and the bonnet 40. The yoke member 48 has an externally threaded surface which engages the internal threads of the threaded portion 38 and the cap member 36 to thereby align the yoke member 48 axially within the chamber 14. An annular surface 52 of the yoke member 48 closes the open upper end portion 26 of the chamber 14.

The valve member 24 has a spindle portion 54 extending upwardly in the chamber 14. The spindle 54 has an axial threaded bore 56 in its upper portion. A spindle cap 58 has an axial threaded end portion 60 and an enlarged upper portion 62. The spindle cap threaded end portion 60 is threadedly engaged to the spindle 54 within the bore 56 to form a spindle extension that extends into the passageway 46 of the bonnet 40. A pin member 64 extends through aligned bores of the spindle cap enlarged upper portion 62 and the spindle portion 54 to further secure the spindle cap 58 to the spindle portion 54.

Figure 2:
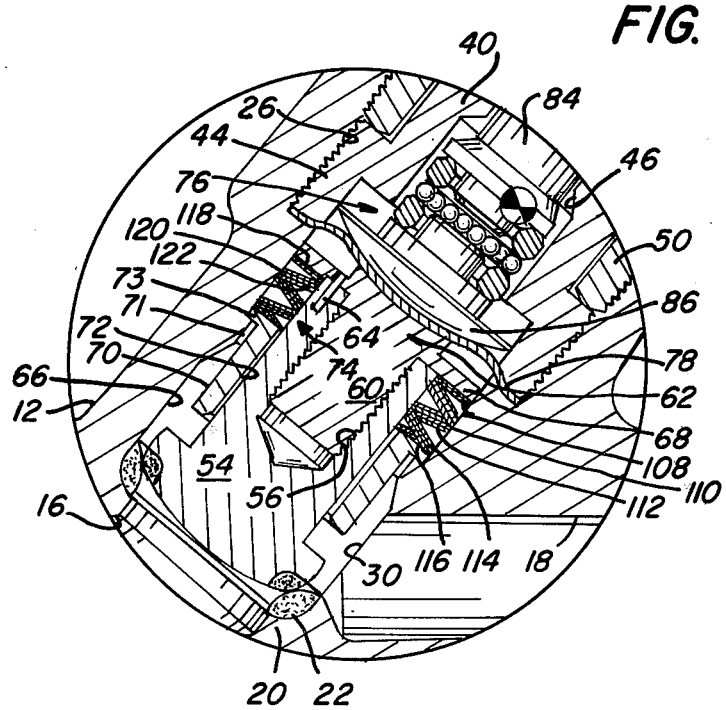
FIG. 2 is an enlarged fragmentary view in section of the valve member positioned within the valve chamber in a closed position engaging a valve seat, illustrating the Belleville spring assembly in a compressed state.

As illustrated in greater detail in FIG. 2 the valve housing 12 and the spindle portion 54 of the valve member 24 form an annulus 66. With the valve member 24 in a closed position, as illustrated in FIG. 2, the annulus 66 is sealed at its lower end portion by the abutting relation of the valve member 24 with the valve seat 22. The spindle cap 58 includes an annular shoulder 68 which closes the upper portion of the annulus 66. A valve guide 70 is positioned in the annulus 66 and includes an axial bore 72. The valve housing 12 has an inwardly extending shoulder 71 in chamber 14 on which a lip 73 of the valve guide is positioned. With this arrangement the valve guide 70 is restrained from downward axial movement within the chamber 14. The spindle portion 54 extends upwardly through the axial bore 72 of the valve guide 70 which serves to maintain the axial position of the spindle 54.

A Belleville spring assembly generally designated by the numeral 74 is positioned around the spindle 54 within the annulus 66 between the valve guide 70 and the annular shoulder 68 of the spindle cap 58. The upper surface of the Belleville spring assembly 74 abuts the annular shoulder 68, and the lower surface of the spring assembly 74 abuts the top of the valve guide 70. With this arrangement the Belleville spring assembly 74 is coaxially positioned with the valve guide 70 and the valve member 24 in the lower portion 30 of the valve chamber 14. The Belleville spring assembly 74, described further in greater detail, acts to urge the valve member 24 upwardly to a second or open position where the valve member 24 is removed from the valve seat 22. The Belleville spring assembly 74 thus normally maintains the valve member 24 in an open position. The Belleville spring assembly 74 is not limited in application to diaphragm valves but may be utilized with other valves, such as check valves. The Belleville spring assembly of the present invention is operable to replace the conventional coil spring of a check valve to provide a more compact, uniform load and to eliminate the problem of buckling inherent with coil springs.

The spindle cap enlarged portion 62 is arranged to abut a flexible metal diaphragm assembly 76 comprising a plurality of diaphragms arranged in overlying arrangement to form a unitary composite diaphragm. The diaphragm 76 has a generally circular disc-like configuration and has an outer circumferential edge that abuts the top of valve housing annular shoulder 32. The lower ring portion 44 of the bonnet 40 has an annular edge 78 that abuts the upper annular edge of the diaphragm assembly 76. In this manner the diaphragm assembly 76 provides a fluid tight seal within the bonnet passageway 46 between the bonnet 40 and the chamber 14.

A valve stem 80 is suitably secured in a threaded axial passageway 82 of the yoke member 48 and includes a stem head 84 positioned in the bonnet passageway 46 which is axially aligned with the yoke member passageway 82. The stem head 84 includes an enlarged head portion 86 positioned within the end portion of the bonnet passageway 46. The enlarged head portion 86 abuts the diaphragm assembly 76 opposite the upper portion 62 of the spindle cap 58.

A fluid tight seal is maintained around the valve stem 80 within the bonnet passageway 46 by a seal assembly generally designated by the numeral 88. An annular recessed portion 90 is formed in the bonnet passageway 46 within the upper end portion of the chamber 14 between the upper annular ring portion 42 of the bonnet 40 and the stem head 84 of the valve stem 80. A packing ring 92 is positioned within the recessed portion 90 and surrounds the valve stem 80 permitting axial movement of the valve stem in the bonnet passageway 46. The packing ring 92 may include a plurality of individual packing rings positioned in overlying relationship. A circular gland follower 94 is positioned in abutting relation with the top surface of the packing ring 92. A gland plate 96 is positioned within the yoke member 48 and surrounds the valve stem 80. The lower surface of the gland plate 96 bears against gland follower 94.

A plurality of bolt members 98 extend through the upper end portion of the yoke member 48 for threaded advancement into engagement with the upper surface of the gland plate 96. Advancing the bolt members 98 through the yoke member 48 into engagement with gland plate 96 transmits compressive forces through the gland follower 94 to the packing ring 92. In this manner the packing ring 92 is expanded to effect a fluid and pressure tight seal between the outer surface of the valve stem 80 and the bonnet passageway 46. This sealing arrangement 88 is disclosed in further detail in U.S. Pat. No. 3,982,729.

A hand wheel 100 is secured to the valve stem 80 by a nut 102. Rotation of the hand wheel 100 rotates the valve stem 80 within the yoke member passageway 82 and the bonnet passageway 46 to advance the enlarged head portion 86 and the diaphragm assembly 76 downwardly. The downward movement of the enlarged head portion 86 and the diaphragm 76 is transmitted through the spindle cap 58 and spindle 54 to the valve member 24. Downward movement of the spindle portion 54 overcomes the upward force exerted by the Belleville spring assembly 74 to compress the Belleville spring assembly and move the valve member 24 into abutting relation with the valve seat 22 to close the valve 10. This is accomplished by rotation of the hand wheel 100 in a preselected direction. Rotation of the hand wheel 100 in the opposite direction releases the compressive forces exerted upon the Belleville spring assembly 74 so that in a relatively short stroke of the spindle 54 the Belleville spring assembly moves the valve member 24 away from the valve seat 22 from the first to the second position. This also advances the enlarged head portion 86 and the diaphragm assembly 76 from the position illustrated in FIG. 2 to the position illustrated in FIG. 1.

As above discussed the Belleville spring assembly 74 abuts the top of the lip 73 of the valve guide 70 at its lower end portion and at the opposite end portion abuts the enlarged upper portion 62 of spindle cap 58. Consequently, the Belleville spring assembly 74 normally urges the spindle 54 and valve member 24 upwardly and away from the valve seat 22. Thus the Belleville spring assembly 74 is supported by the valve guide 70 and is arranged to expand and retract to urge the valve member 24 toward an open position.

In the operation of the diaphragm valve 10 it is an important feature that the valve member 24, spindle 54 and spindle cap 58 be stabilized within the chamber 14 to resist vibration tending to displace the valve member 24 from axial movement within the chamber 14. In the event the valve member 24 becomes displaced from axial alignment in the chamber 14, the valve member will not properly engage the valve seat 22 to close the valve. In addition the valve member 24 must be supported within the chamber 14 to resist spinning movement that might prevent the valve member from maintaining a sealing engagement with the valve seat 22 in a closed position. In order to overcome the problem of misalignment resulting in deformation of the valve member 24 in the valve chamber 14, the mass of the spindle 54 and cap 58 is increased. This improves the stability of the valve member 24 in the valve chamber so that the valve member is more resistant to deformation and vibration and is supported for axial movement relative to the valve seat 22.

Preferably, the Belleville spring assembly 74 includes a plurality of spring washers arranged in a series stack, i.e. one on top of another, positioned within the annulus 66 between the lip 73 of the valve guide 70 and the annular shoulder 68 of the spindle cap 58. Each of the spring washers has the configuration of a fustrum of a cone with an inner diameter adjacent the spindle 54 and an outer diameter adjacent the valve housing 12. The number of spring washers utilized in the assembly 74 is determined by the thrust required to overcome the mass of the valve member 24 and urge the valve member into a normally open position. Consideration must also be given to the amount of deflection the diaphragm assembly 76 is to experience when the valve is open. Thus, the spring force generated by the Belleville spring assembly 74 may be adjusted by including a single spring washer or a plurality of spring washers arranged in a series stack around the spindle 54.

Not only must consideration be given to the amount of load to be exerted upon the valve member 24 without exceeding a permissible deflection of the diaphragm assembly 76 but the change in the length of the spring assembly 74 must be controlled between the free length and the solid length. The stroke or length of travel of the valve member 24 between the open position illustrated in FIG. 1 and the closed position illustrated in FIG. 2 must be accomplished by changing the length of the spring assembly 74. Therefore, to accommodate a preselected stroke of the valve member 24 for a given load requirement, in order to move the valve member from the closed to open position, Belleville spring washers are arranged in parallel relation and a plurality of parallel positioned spring washers are arranged in series.

A configuration of the Belleville spring assembly 74 is illustrated in FIG. 2 where a plurality of spring units 108, 110, 112, 114 and 116 are arranged in a series stack between the valve guide 70 and the spindle cap 58. The series stack of spring units are arranged in series relation to exert a preselected thrust upon the valve member 24 to move the valve member 24 through a relatively short stroke. Each spring unit includes a preselected number of individual spring washers 118, 120 and 122 arranged in parallel relation. Thus, for a given load for urging the valve member 24 to the open position, a preselected number of spring washers are arranged in parallel to provide the necessary deflection of the composite stack of spring units of the assembly 74 to move the valve member 24 through a preselected linear stroke.

With this arrangement the Belleville spring assembly 74 provides in a relatively compact area a high linear thrust to move the valve member 24 through a preselected stroke from a closed to an open position. Furthermore, the compact arrangement of series stacked spring units of parallel arranged spring washers serves to stabilize the spindle 54 and cap 58 and resist vibration and spinning within the chamber 14. It will be apparent from the present invention that the individual Belleville spring washers of the spring assembly 74 may be arranged in a preselected parallel and series relation to control the load exerted upon the valve member 24 and the length of stroke thereof.

According to the provisions of the patent statutes, I have explained the principle, preferred construction and mode of operation of my invention and have illustrated and described what I now consider to represent its best embodiments. However, it should be understood, that, within the scope of the appended claims, the invention may be practiced otherwise than as specifically illustrated and described.

I claim:
1. A valve comprising,
    a valve housing having a chamber therein,
    inlet and outlet openings in said valve housing communicating with said chamber,
    a valve seat in said chamber between said inlet and outlet openings,
    a valve member positioned for axial movement in said chamber and in overlying relation with said valve seat to control the flow of fluid between said inlet and outlet openings,
    said valve member being supported in said chamber to move between a first position engaging said valve seat to close said valve and a second position removed from said valve seat to open said valve,
    said valve member and said valve housing forming an annulus therebetween,
    said valve member having an annular shoulder positioned in said annulus,
    a valve guide surrounding said valve member in said annulus to maintain the axial position of said valve member in overlying relation with said valve seat, said valve guide having an axial bore through which said valve member extends,
    said valve guide having an upper end portion with an annular lip,
    said valve housing an annular shoulder positioned in said annulus in spaced axial relation to said valve member annular shoulder,
    said valve guide annular lip being positioned in overlying abutting relation with said valve housing annular shoulder to restrain downward axial movement of said valve guide in said chamber,
    said valve guide annular lip being maintained in spaced axial relation to said valve member annular shoulder in said annulus,
    a Belleville spring assembly including a plurality of spring washers arranged in a stack surrounding said valve member in the portion of said annulus between said valve member annular shoulder and said valve guide annular lip,
    one of said spring washers positioned in abutting relation with said valve member annular shoulder and another of said spring washers positioned in abutting relation with said valve guide annular lip, and
    said plurality of spring washers being operable to expand and contract to exert a preselected axial thrust upon said valve member to urge said valve member toward a second position removed from said valve seat to open said valve.

* * * * *